(12) United States Patent
Evans

(10) Patent No.: US 7,810,602 B2
(45) Date of Patent: Oct. 12, 2010

(54) VARIABLE ENERGY MANAGEMENT SYSTEM FOR PEDESTRIAN, OCCUPANT, VEHICLE

(75) Inventor: Darin Evans, Spring Lake, MI (US)

(73) Assignee: NetShape Energy Management, LLC, Novi, MI (US)

( * ) Notice: Subject to any disclaimer, the term of this patent is extended or adjusted under 35 U.S.C. 154(b) by 752 days.

(21) Appl. No.: 11/562,775

(22) Filed: Nov. 22, 2006

(65) Prior Publication Data

US 2007/0114772 A1     May 24, 2007

Related U.S. Application Data

(60) Provisional application No. 60/739,508, filed on Nov. 23, 2005.

(51) Int. Cl.
*B60K 28/10* (2006.01)

(52) U.S. Cl. .................. 180/274; 280/750; 280/751; 280/752; 280/753

(58) Field of Classification Search .............. 180/274; 280/750, 751, 752, 753
See application file for complete search history.

(56) References Cited

U.S. PATENT DOCUMENTS

| | | |
|---|---|---|
| 3,096,116 A | 7/1963 | Kost |
| 3,702,706 A | 11/1972 | Sobkow |
| 3,908,781 A * | 9/1975 | Oishi et al. ............... 293/117 |
| 3,933,387 A | 1/1976 | Salloum et al. |
| 4,948,168 A | 8/1990 | Adomeit et al. |
| 4,995,659 A | 2/1991 | Park |
| 5,066,064 A | 11/1991 | Garnweidner |
| 5,382,051 A | 1/1995 | Glance |
| 5,464,250 A | 11/1995 | Sato |
| 5,560,672 A | 10/1996 | Lim et al. |
| 5,575,500 A | 11/1996 | Mimura et al. |
| 5,622,379 A | 4/1997 | Suzuki et al. |
| 5,765,863 A | 6/1998 | Storey et al. |
| 5,836,641 A | 11/1998 | Sugamoto et al. |
| 5,845,935 A | 12/1998 | Enders et al. |
| 5,865,466 A | 2/1999 | Yamamoto et al. |
| 5,884,962 A | 3/1999 | Mattingly et al. |
| 5,988,733 A | 11/1999 | Kamo et al. |
| 6,017,084 A | 1/2000 | Carroll, III et al. |
| 6,036,251 A | 3/2000 | Yagishita et al. |

(Continued)

FOREIGN PATENT DOCUMENTS

WO     2005012043 A1     2/2005

*Primary Examiner*—Toan C To
(74) *Attorney, Agent, or Firm*—Price, Heneveld, Cooper, DeWitt & Litton, LLP

(57) ABSTRACT

An energy-absorbing system includes two formed and sealed components bonded together to form crush boxes that entrap air for controlled distribution during an impact, and an activator system adapted to extend the crush boxes in the event of a vehicle crash. Channels interconnect the crush boxes for optimal control of lateral flow of air for lateral energy distribution. The components can be thermoformed, injection molded, or otherwise formed. By this arrangement, the crush boxes provide a first level of static energy absorption when impacted in an undeployed state such that energy is absorbed at a first rate and stroke. Also, the crush boxes can be extended to provide a second level of static energy absorption when impacted in a vehicle crash (i.e., the activator system is energized and the crush boxes extended or "deployed") such that energy is absorbed at a one or more different rates and strokes.

30 Claims, 13 Drawing Sheets

U.S. PATENT DOCUMENTS

| | | | |
|---|---|---|---|
| 6,059,310 A | 5/2000 | Buss | |
| 6,086,098 A | 7/2000 | Reiter et al. | |
| 6,095,593 A | 8/2000 | Johann et al. | |
| 6,126,231 A | 10/2000 | Suzuki et al. | |
| 6,170,871 B1 | 1/2001 | Goestenkors et al. | |
| 6,193,272 B1 | 2/2001 | Aigner et al. | |
| 6,199,942 B1 | 3/2001 | Carroll, III et al. | |
| 6,203,096 B1 | 3/2001 | Noda et al. | |
| 6,217,109 B1 | 4/2001 | Okana et al. | |
| 6,224,119 B1 | 5/2001 | Haffmans | |
| 6,234,526 B1 | 5/2001 | Song et al. | |
| 6,247,745 B1 | 6/2001 | Carroll, III et al. | |
| 6,364,348 B1 | 4/2002 | Jang et al. | |
| 6,394,536 B2 | 5/2002 | Takahara | |
| 6,409,210 B1 | 6/2002 | Emerling | |
| 6,491,321 B1 | 12/2002 | Nakashima et al. | |
| 6,520,568 B2 | 2/2003 | von Holst et al. | |
| 6,547,280 B1 | 4/2003 | Ashmead | |
| 6,557,888 B1 | 5/2003 | Nakashima et al. | |
| 6,592,143 B2 | 7/2003 | Takahashi et al. | |
| 6,669,230 B1 | 12/2003 | Nakashima et al. | |
| 6,679,967 B1 | 1/2004 | Carroll, III et al. | |
| 6,681,907 B2 | 1/2004 | Le | |
| 6,715,592 B2 | 4/2004 | Suzuki et al. | |
| 6,722,694 B1 | 4/2004 | Nakashima et al. | |
| 6,733,064 B2 | 5/2004 | Fox et al. | |
| 6,758,490 B2 | 7/2004 | Hoeft et al. | |
| 6,779,835 B2 | 8/2004 | Fox et al. | |
| 6,877,579 B1 * | 4/2005 | Håland | 180/274 |
| 6,890,001 B1 | 5/2005 | Smith | |
| 6,908,143 B2 | 6/2005 | Ashmead | |
| 6,910,714 B2 | 6/2005 | Browne et al. | |
| 6,923,483 B2 * | 8/2005 | Curry et al. | 293/107 |
| 6,948,737 B2 | 9/2005 | Ohji et al. | |
| 7,347,464 B2 * | 3/2008 | Tanabe | 293/4 |
| 2001/0028163 A1 | 10/2001 | Breed | |
| 2002/0053815 A1 | 5/2002 | Ernst et al. | |
| 2002/0171230 A1 | 11/2002 | Takimoto et al. | |
| 2003/0020290 A1 | 1/2003 | Cherry | |
| 2003/0097212 A1 | 5/2003 | Feser et al. | |
| 2004/0145163 A1 | 7/2004 | Galmiche et al. | |
| 2004/0169398 A1 | 9/2004 | Browne et al. | |
| 2005/0082881 A1 | 4/2005 | Bristow et al. | |
| 2005/0110258 A1 | 5/2005 | Fuks et al. | |
| 2005/0257979 A1 | 11/2005 | Hamada et al. | |

* cited by examiner

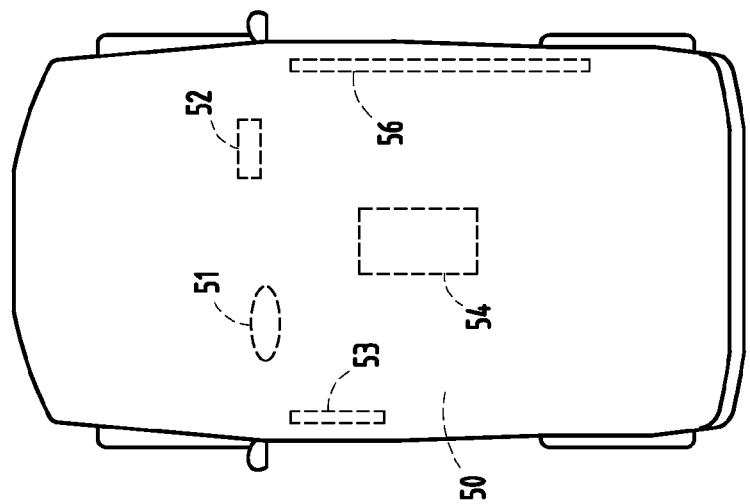
FIG. 9
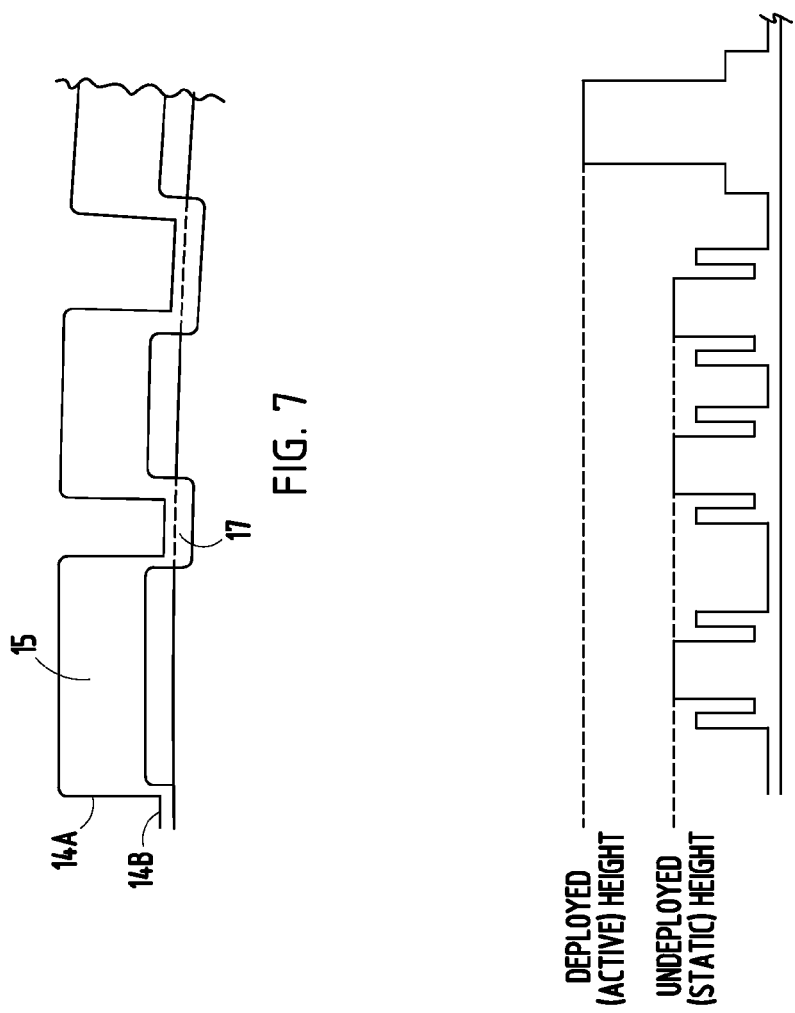
FIG. 7
FIG. 8

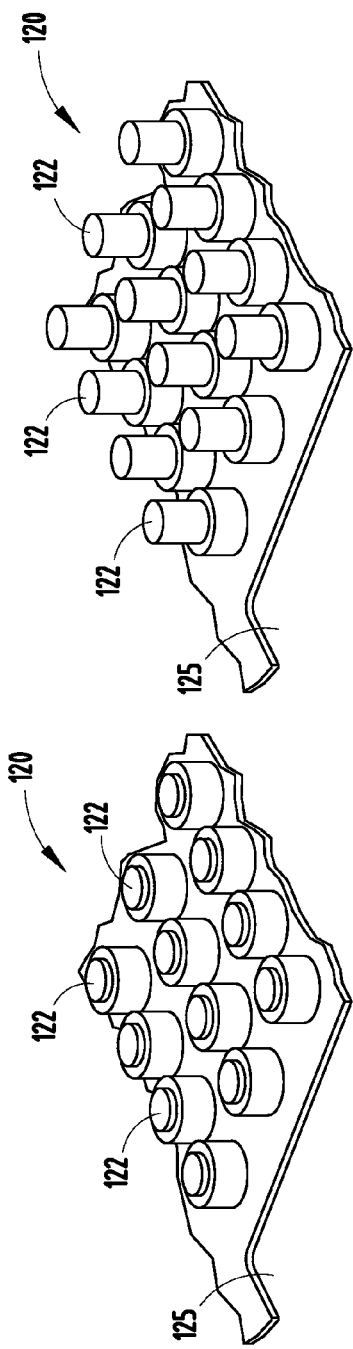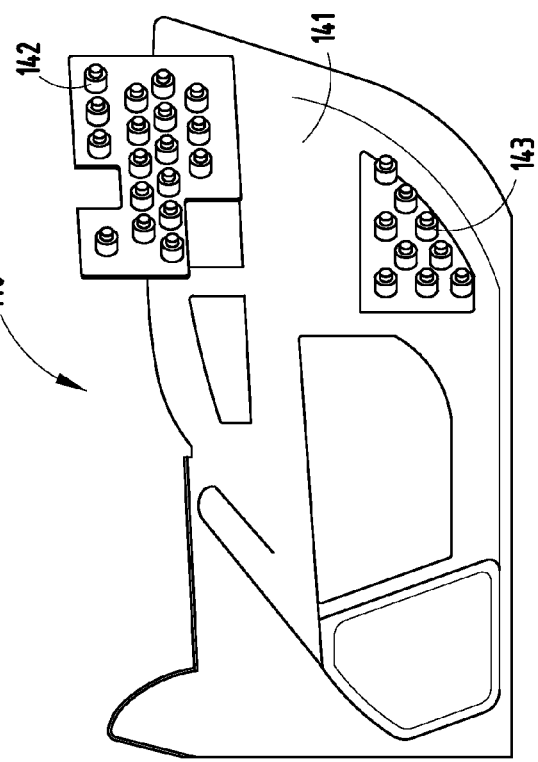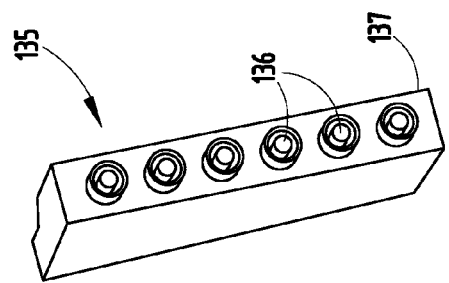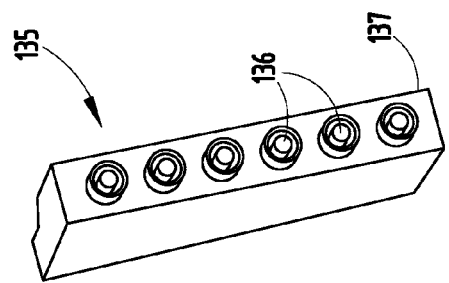

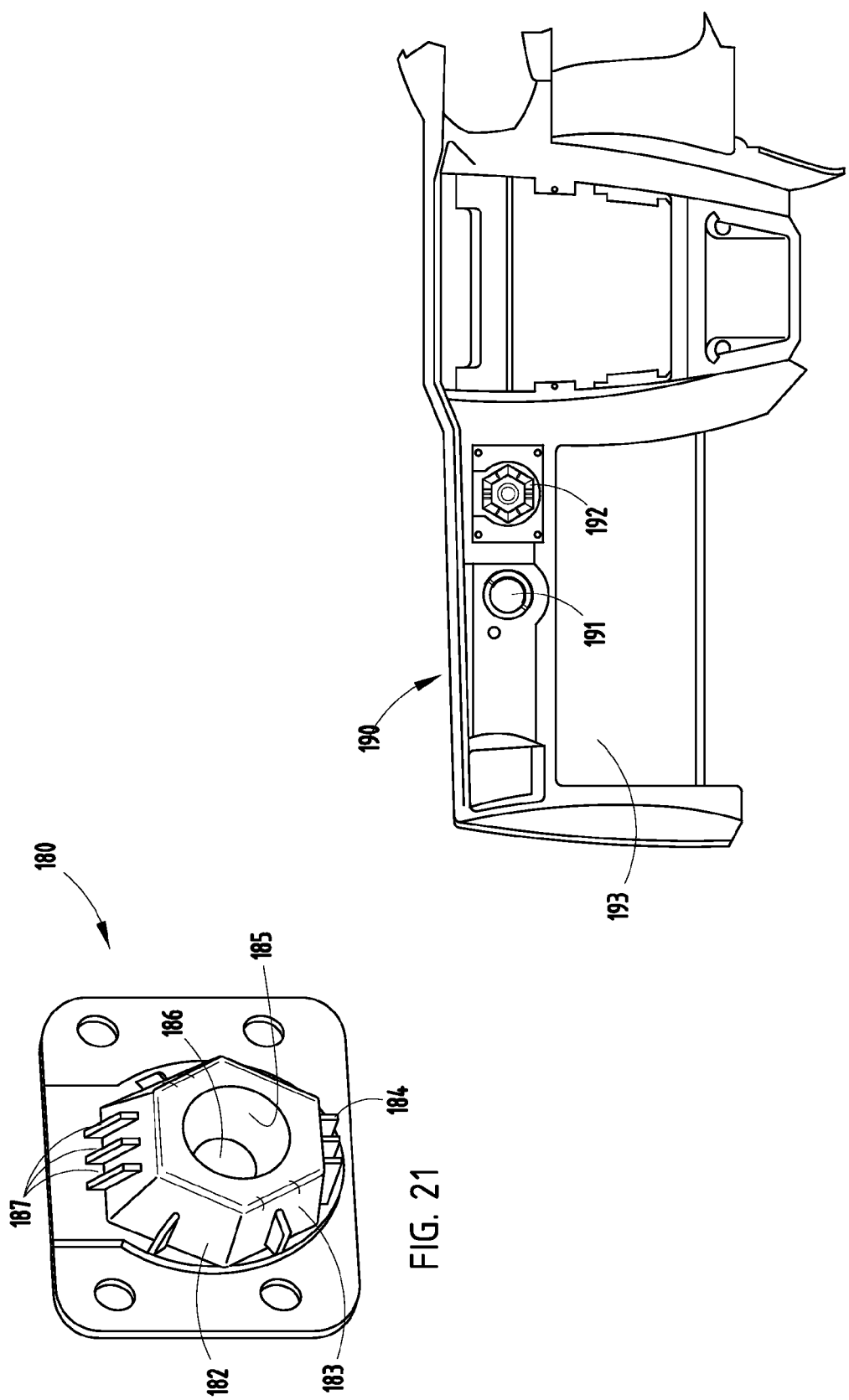

VARIABLE ENERGY MANAGEMENT SYSTEM FOR PEDESTRIAN, OCCUPANT, VEHICLE

CROSS REFERENCE TO RELATED APPLICATION

This application claims benefit under 35 U.S.C. §119(e) of co-assigned provisional application Ser. No. 60/739,508, filed Nov. 23, 2005, entitled IMPACT ENERGY ABSORBER WITH ACTIVE AND PASSIVE ASPECTS, the entire contents of which are incorporated herein in their entirety.

BACKGROUND

The present invention relates to components and systems adapted for variable absorption of impact energy, and more specifically relates to an energy absorber for use on front and rear bumpers of vehicles and in the passenger compartment of vehicles, such as on the interior surface of structural roof pillars, headliners, interior door panels, instrument panels, and other places where impact absorption is an important feature of the component. It is contemplated that a scope of the present invention is not limited to automobiles, nor to only passenger vehicles.

It is difficult to reduce vehicle size while also maintaining a comfortable amount of internal space for passengers and while also maintaining passenger safety. Specifically, the packaging space within modern vehicle passenger compartments is becoming more severe (i.e., more critical) as vehicles are becoming smaller, since the passenger compartment within the vehicles must remain sufficient in size for good passenger comfort and movement. The net result is that there is less space between the outside of the vehicle and the inside of the vehicle (i.e., the passenger compartment) for the vehicle's body structure. For example, the structural pillars of a vehicle must be sufficient in size to structurally support the vehicle's roof, but must be as small as possible in cross section in order to maximize a size of the passenger compartment.

One way of increasing passenger safety (i.e., reducing passenger injury during a vehicle crash) is to cover rigid components (i.e., components that might cause injury to a passenger during a vehicle crash) with an energy-absorbing trim component or an energy-absorbing layer under the trim component. However, such components and arrangements tend to be thicker (in order to provide a longer "crush stroke"), which results in a greater loss of the internal space in the vehicle's passenger compartment. Obviously, components can also be made stiffer so that they provide increased energy absorption (i.e., greater deceleration) during a vehicle crash, but an upper level of stiffness is quickly reached since higher levels of stiffness can cause the component itself to create injury to the passenger.

More specifically, one objective of safety devices within the passenger compartment of an automobile or other mode of transportation is to reduce the severity of injury to the occupant when involved in high-speed collisions. The main approach is to decelerate the occupant during the impact at a slow enough rate that major injury, broken bones, internal injuries, trauma to the head, etc. will not cause permanent debilitation, extensive reconstruction and therapy, or death. Several types of energy management strategies are taken, usually in combination. These are: constraints, such as seat belts, active systems, which sense the severity of an impact and deploy a cushioning device or initiate an avoidance mechanism and passive systems, such as air bags and other static energy-absorbing structures and materials. With the passive systems, there is usually a conflict in the ability to reduce the deceleration rate (minimize loads and G forces on the occupant) and the desire to maintain the minimum amount of space that a structure requires (i.e., smaller parts provide smaller impact strokes). Physics dictates that the kinetic energy involved in the deceleration of an occupant is equivalent to the sum of the load exerted on the occupant times the amount of displacement into the structure. Thus if it is desired to keep the loads/acceleration low, it requires more available crush space, which is often in conflict with the desire to maximize occupant compartment space, improve visibility and comfort, etc. In order to minimize the space, significant efforts are made to create a structure that can absorb the energy efficiently, that is to keep the load/acceleration as constant as possible, just below the desired limits until all the energy is absorbed. Many different types of structures have been employed to achieve this end, such as expanded or foamed materials, injection-molded ribbed structures, various shaped structures from numerous types of materials and manufacturing methods. Each of these structures is limited to the laws of physics described above. The present invention involves bringing elements of the active and passive systems together in a way that changes the limits of the physics during an impact event while not encroaching on the occupant space during normal operating conditions.

An improved energy absorber is desired for providing optimal energy absorption, including a longer crush stroke, without subtracting from the interior passenger compartment of vehicles. In addition to "gross" or total impact energy absorption, it is also desirable to provide a system that not only passively distributes energy absorption during an impact, but further that actively laterally distributes energy during an impact.

Still further, it is desirable to provide a system that is responsive to vehicle crashes, and that actively adjusts to provide optimal impact-absorbing characteristics for particular types of impacts/vehicle crashes. For example, a first energy absorbing profile (i.e., energy absorption versus impact stroke curve) may be most appropriate for a low-speed impact (such as to minimize vehicle damage), a second energy-absorbing profile may be more appropriate for low-speed pedestrian impact (such as to minimize injury to the pedestrian), a third energy-absorbing profile may be more appropriate for high-speed impact against a fixed barrier (so as to minimize injury to a vehicle passenger from forward impact), a fourth energy-absorbing profile may be more appropriate for a side-of-vehicle impact (so as to minimize injury to a vehicle passenger from side forces), etc.

In short an improved total and variable energy management system is desired that optimizes pedestrian and occupant safety while minimizing vehicle damage. In addition, it is desirable to provide an energy absorption system that does not require expensive tooling with long lead times. Further, it is desirable to provide an energy absorption system that can be readily modified and used across multiple vehicle makes and models. Still further, it is desirable to provide an energy management system that is responsive to a type of impact, and that extends outward in response to a particular signal from a pre-crash or post-impact sensor.

Thus, a system is desired having the aforementioned advantages and solving the aforementioned problems.

SUMMARY OF THE PRESENT INVENTION

The present invention focuses on a new approach. It recognizes that sensors that sense the severity and type of impact event are now standard on almost all vehicles. These sensors are typically used to change the tension on seatbelts and to appropriately deploy passive supplemental inflatable restraints (air bags). Air bags are placed in various locations around the vehicle, such as the steering wheel, in the dash on the passenger side, and now many times in the doors or upper sills to protect the occupant from side impact. These devices are very expensive and cannot be reset. Once deployed, they must be completely replaced and oftentimes can damage other surrounding structures on the vehicle. In addition, they are fairly finite in nature, i.e., placed in specific locations, which cannot account for every type of impact situation. Therefore, in addition to the air bags, other energy-absorbing components are placed in various areas around the vehicle that the engineers believe an occupant may come in contact with. These are usually in the headliner, pillar trim, door panels, knee bolsters (IP close-out panels), seat backs, etc. As mentioned previously, each of these potential contact areas must be engineered and optimized to pass certain injury criteria such as FMVSS 201, FMVSS 208 and others with the limitations as noted above. One novel aspect/approach pursued by this invention is to change the shape of the structures according to the "sensed" impact from a static state that packages in minimal state to a deployed state that increases the available crush space during an impact event. In this manner, the limitations of the physics associated with the static condition are overcome thus providing the opportunity to significantly reduce the acceleration levels exerted on the occupants without sacrificing the space during normal operating conditions. In this way, it would also be possible to provide impact energy absorption in many areas that otherwise were not packagable or addressed by the test/engineering professionals.

In one aspect of the present invention, an energy-absorbing system is provided for a passenger compartment of a vehicle, the energy-absorbing system being adapted to cover an interior surface of a structural component and adapted to provide energy absorption for reducing passenger injury during a vehicle crash where the passenger is thrown against and impacts the interior surface. The system includes an energy-absorbing component shaped to cover at least a portion of the interior surface of the structural component and defining a thickness extending generally perpendicular to the interior surface. The energy-absorbing component has crush box structures constructed to crush along a shorter first crush stroke distance and absorb energy based on a first energy absorbing profile when impacted in a direction generally parallel the thickness. An activator is connected to the crush box structures and constructed to telescopingly expand the crush box structures to an increased thickness to thus crush along a longer second crush stroke distance and absorb energy based on a second energy absorbing profile when a vehicle impact is sensed, the first and second energy absorbing profiles being different shapes and absorbing energy at different rates.

In another aspect of the present invention, in a passenger compartment of a vehicle having an energy-absorbing system that covers at least a part of an interior surface of a structural component, the energy-absorbing system includes at least one energy-absorbing component adapted to provide energy absorption for reducing passenger injury during a vehicle crash where the passenger is thrown against and impacts the interior surface. An improved energy-absorbing component defines a thickness extending generally perpendicular to the interior surface and has crush boxes constructed to crush along a shorter first crush stroke distance and to absorb energy based on a first energy-absorbing profile when impacted in a direction generally parallel the thickness. The crush boxes are adapted for connection to an activator and are telescopingly extendable to an increased dimension to thus crush along a longer second crush stroke distance and absorb energy based on a second energy-absorbing profile when a more severe vehicle impact is sensed. The first and second energy-absorbing profiles are different shapes and absorb energy at different rates as desired for impact absorption under different crash conditions.

In another aspect of the present invention, an energy-absorbing system for covering structural components in a passenger compartment of a vehicle includes first and second sheets defining crush boxes that inter-fit to defining air-trapping chambers. The crush boxes each define a thickness and are constructed to crush and absorb energy when impacted in a direction generally parallel the thickness.

In another aspect of the present invention, an energy-absorbing system includes an energy absorber having internal structure that provides a first level of impact resistance over a first crush stroke distance. An activator and a controller are operably connected to each other and to the internal structure for variably controlling energy absorption by the internal structure to provide a variable level of impact resistance.

In still another aspect of the present invention, an energy-absorbing system is provided for a passenger compartment of a vehicle, the energy-absorbing system being adapted to cover an interior surface of a structural component and adapted to provide energy absorption for reducing passenger injury during a vehicle crash where the passenger is thrown against and impacts the interior surface. The system includes an energy-absorbing component shaped to cover at least a portion of the interior surface of the structural component and defining a thickness extending generally perpendicular to the interior surface. The energy-absorbing component has crush box structures constructed to crush along a crush stroke distance and absorb energy based on an energy-absorbing profile when impacted in a direction generally parallel the thickness. A valve is connected to the crush box structures and constructed to control one of in-flow and out-flow of fluid (e.g. air or CO2) to the crush box structures. A device is provided for operating the valve based on a severity of vehicle crash to control flow of the fluid and therefore change the energy-absorbing profile of the crush box structures based on the type of vehicle crash and size and position of occupant.

In yet another aspect of the present invention, a system for absorbing energy in a vehicle includes a vehicle body defining a passenger compartment with occupant-related energy-absorbing members and also including front and rear bumper systems with bumper-related energy-absorbing members. The occupant-related energy absorbing members and the bumper-related energy absorbing members each have respective energy-absorbing profiles with known rates of energy absorption during respective crush strokes. Sensors are located on the vehicle for sensing a type or severity of a vehicle impact and for generating a signal related to the type or severity of vehicle impact. A control is operably connected to the sensors and also to the occupant-related energy absorbing members and to the bumper-related energy-absorbing members; the control being configured to receive the signal and to cause the occupant-related energy-absorbing members and to cause the bumper-related energy absorbing members to vary from the respective energy-absorbing profiles by changing at least one of the rate of energy absorption and a length of the crush stroke.

In another aspect of the present invention, a system for absorbing energy in a vehicle includes a vehicle body defining a passenger compartment with deployable knee bolster energy-absorbing member. A sensor is located on the vehicle for sensing a vehicle impact and for generating a signal related to the vehicle impact. A control is operably connected to the sensor and also to the bolster energy-absorbing member. The controller is configured to receive the signal and to cause the bolster energy-absorbing member to extend and change a length of a crush stroke of the knee bolster absorbing member. Thus the crash resistance is controlled to adapt to occupant size and position.

In yet another aspect of the present invention, a system for absorbing energy in a vehicle includes a vehicle body defining a passenger compartment with at least one energy-absorbing member positioned within the passenger compartment, the energy-absorbing member being adjustable in energy-absorbing capability. A sensor is located on the vehicle for sensing a vehicle impact and for generating a signal related to the vehicle impact. A controller is operably connected to the sensor and also to the energy-absorbing member; the controller being configured to receive the signal and to cause the energy-absorbing member to adjust the energy-absorbing member in correspondence to a type of impact being experienced by the vehicle.

In still another aspect of the present invention, a variable energy management system for absorbing energy during a vehicle crash includes a vehicle body defining a passenger compartment with at least one deployable energy-absorbing member positioned within the passenger compartment and including a bumper system with at least one second deployable energy-absorbing member. A sensor is located on the vehicle for sensing a vehicle impact and for generating at least one signal related to the vehicle impact. A controller is operably connected to the sensor and also to the first and second energy-absorbing members. The controller is configured to receive the signal and is programmed to selectively deploy one or both of the first and second energy-absorbing members in at least three different ways, the first way being to minimize injury to a pedestrian struck by the bumper system, the second way being to minimize injury to an occupant riding in the vehicle during a vehicle crash, and the third way being to minimize damage to the vehicle.

In another aspect of the present invention, a variable energy management system for absorbing energy during a vehicle crash includes a vehicle body defining a passenger compartment with at least one deployable energy-absorbing member positioned within the passenger compartment and including a bumper system with at least one second deployable energy-absorbing member. A sensor is located on the vehicle for sensing a vehicle impact and for generating at least one signal related to the vehicle impact. A controller is operably connected to the sensor and also to the first and second energy-absorbing members. The controller is configured to receive the signal and being programmed to selectively deploy the first and second energy-absorbing members in ways associated with increasingly severe vehicle crashes.

In another aspect of the present invention, a method includes steps of providing a plurality of energy-absorbing components including several extendable crush boxes, providing an actuator connected to the crush boxes for controlling air flow during impact of the crush box, and providing sensors for sensing at least two different types of vehicle impacts, the two different types being of a different type and severity. The method includes connecting a controller to the sensors, the actuator, and at least some of the crush boxes, and programming the controller to selectively extend the crush boxes to achieve a desired energy absorption corresponding to each of the different types of vehicle impacts.

An object of the present invention is to ingrate a deployable energy-absorbing member into surrounding structure to provide other functions such as attachment, noise abatement, support, and the like.

These and other aspects, objects, and features of the present invention will be understood and appreciated by those skilled in the art upon studying the following specification, claims, and appended drawings.

BRIEF DESCRIPTION OF DRAWINGS

FIG. 7 is a cross-sectional view similar to FIG. 3 but showing crush boxes of different shapes and sizes.

FIG. 8 is a cross-sectional view showing an energy absorber sheet component constructed from a pair of mating thermoformed sheets.

FIG. 9 is a plan view of a vehicle including energy-absorbing components associated with the vehicle's headliner.

FIGS. 13-14 are perspective views of an array of crush boxes in FIG. 12, FIG. 13 showing un-deployed crush boxes configured for a first profile of energy absorption and FIG. 14 showing deployed crush boxes configured for a second profile of energy absorption.

FIG. 15 is a side view of an "A" pillar for supporting a vehicle roof and including an energy-absorbing component with crush boxes positioned on the "A" pillar, and FIG. 16 is a perspective view of the energy-absorbing component of FIG. 15.

FIG. 17 is an inboard side view of a door panel including an energy-absorbing component covering portions of the door panel, the component including regions covered by arrays of deployable crush boxes.

FIG. 21 is a perspective view of an energy-absorbing component, including a customized energy-absorbing crush box made of thermoplastic material.

FIG. 22 is an elevational view of a rear side of a thermoplastic component forming part of an instrument panel, the component including structure forming useful features on the instrument panel such as air ducts and glove box compartments and also including deployable crush boxes extendable toward a passenger.

DETAILED DESCRIPTION OF PREFERRED EMBODIMENTS

Figure 2:
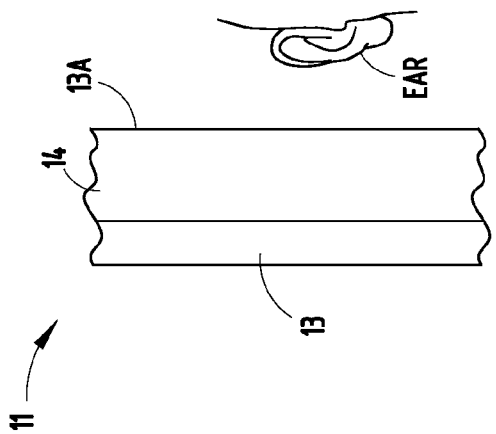
FIG. 2 is a side view of an "A" pillar of the vehicle in FIG. 1, including the structural pillar, the trim, and the energy-absorbing sheet component therebetween.
Figure 4:
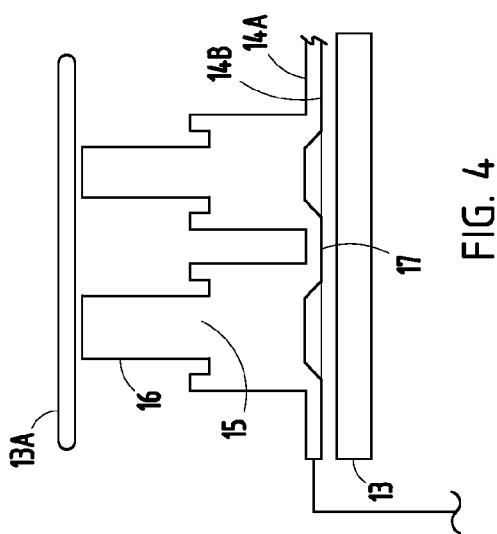
FIGS. 3-4 are cross-sectional views taken along line III-III in FIG. 2, FIG. 3 showing a static arrangement for energy absorption, and FIG. 4 showing a deployed "extended" arrangement for energy absorption.
Figure 1:
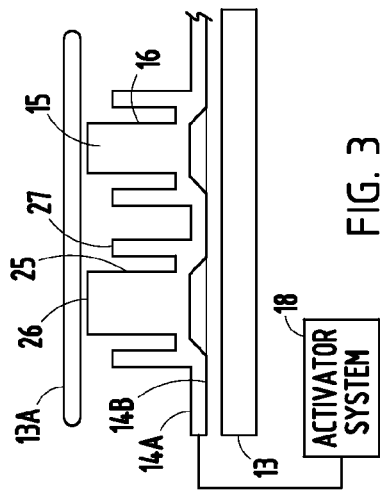
FIG. 1 is a side perspective view of a vehicle.
Figure 3:
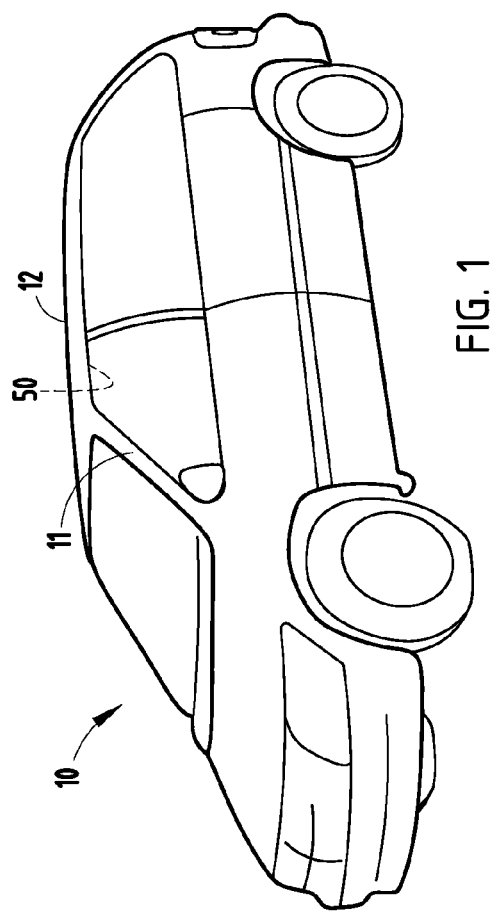

A vehicle 10 (FIG. 1) includes an "A" pillar 11 that along with other pillars supports a roof 12. The illustrated "A" pillar 11 includes a vertically-extending structural metal beam 13, a trim cover 13A aesthetically covering a visible part of the interior surface of the beam 13, and an energy-absorbing sheet component 14 positioned between the beam 13 and trim cover 13A. The component 14 can be integral with or separate from the cover 13A. The illustrated component 14 comprises a pair of thermoformed polymeric sheets 14A and 14B bonded or sealed together (see FIGS. 3-4) to define air-trapping cavities 15 within crush boxes 16 (also called "crush cans" and/or "internal structure" adapted to absorb energy, such as if a passenger's head impacts the "A" pillar during a vehicle crash). It is noted that the energy absorber could also be made by blow-molding or by adhering a thermoformed sheet to a second surface (such as to the trim cover 13A or to the structural part/pillar 11). Also, the sheets can be formed and sealed components made from injection molding and other methods. The components can be bonded in any manner, such as by spin welding, vibration welding, and other means for bonding together to form hermetic seals.

In a preferred form, each crush box 16 is interconnected with other crush boxes via channels 17 for optimal control of lateral flow of air for lateral energy distribution. An activator system 18 includes a source of fluid, such as gases from an explosive agent similar to that used to deploy air bags in a vehicle passenger compartment, or such as gases from a compressed gas cartridge of $CO_2$. The source of fluid is operably connected to the channels 17 and/or to one or more of the crush boxes 16 for extending (i.e., "deploying") the crush boxes 16 upon sensing that a vehicle crash is occurring.

Figure 5:
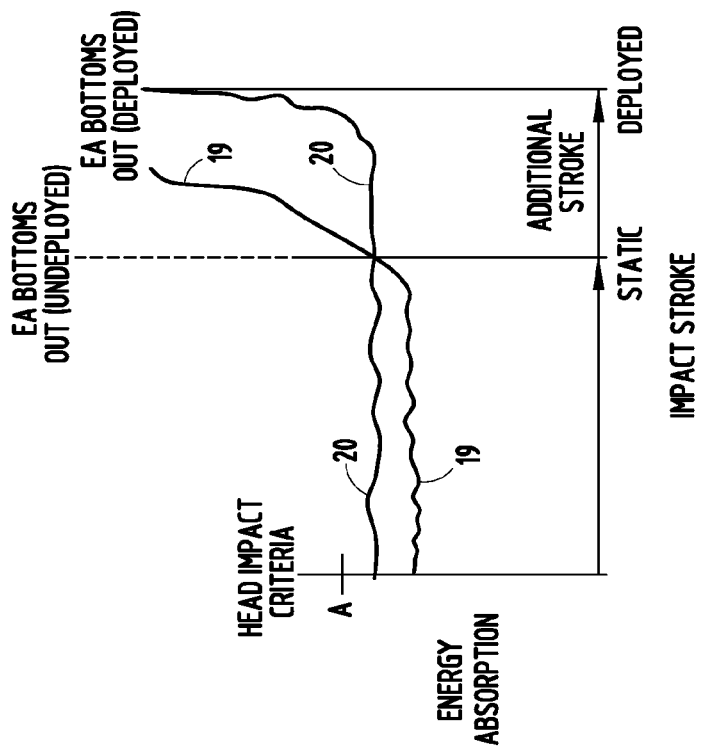
FIG. 5 is a force-deflection curve showing energy absorption in the static and deployed arrangement of FIGS. 3-4.

By this arrangement, the crush boxes 16 provide a first level of "static" (un-deployed) energy absorption when impacted (FIG. 3) (i.e., the activator system 18 is not energized) such that the component 14 absorbs energy along a first force-deflection curve line 19 during its impact stroke. Also, the crush boxes 16 provide a second level of "dynamic" (deployed) energy absorption when impacted in a vehicle crash (FIG. 4) (i.e., the activator system 18 is energized and the crush boxes extended or "deployed") such that the component 14 absorbs energy along a second (different) force-deflection curve line 20. Part of the dynamic energy absorption is from the cushioning-type energy absorption received from the compressed gases due to the controlled flow of gas/air. An additional part of the energy absorption is from the deformation of the thermoplastic material in the crush boxes themselves during crushing collapse of the crush boxes. It is noted that the "static" un-deployed curve line 19 (FIG. 5) and the "active" (deployed) curve line 20 have different rates of resistance over their impact strokes and/or have different impact strokes and/or have different rates of energy absorption (i.e., force times distance), depending on their particular designs. The shape of the force-deflection curve lines can be controlled to a desired "best shape" by optimizing the material type, as well as part geometry (e.g. size, shape, and thicknesses of the walls of the crush boxes), and also by optimizing the pressure and type of fluid injected into (or controlled outflow of) the cavities 15, and also by controlling a size, shape and location of channels 17 and air-release apertures 21, and also by material selection for the thermoformed sheets. Thus, a sophisticated energy absorber with passive and active aspects can be provided, with the active aspect providing an increased impact stroke and actively controlled energy distribution. Further, the increased impact stroke is only provided upon sensing that a vehicle crash has occurred, such that the increased stroke does not detract from the passenger compartment space until such time as that the increased stroke is a priority (i.e., due to the vehicle crash).

Figure 6:
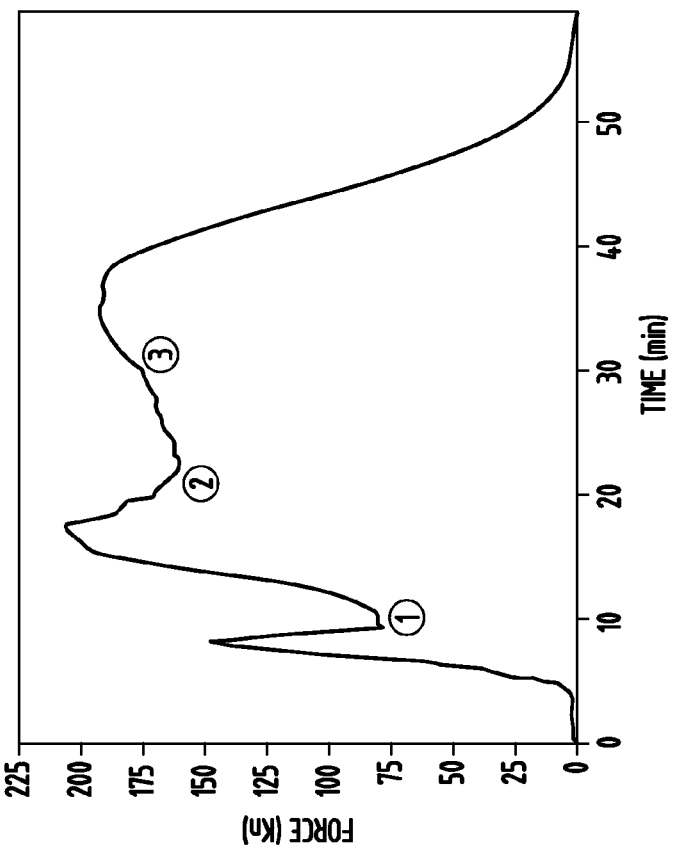
FIG. 6 is a force-deflection curve showing a more sophisticated multi-step sequence of energy absorption.

FIG. 6 illustrates that the force deflection curve can be designed to give stepped increases (or decreases) in the force of resistance (axis y) during the crush stroke (axis x). This can be accomplished such as by providing one or more offsets 25 between upper and lower portions 26 and 27 of the side walls of the crush boxes 16. (See FIG. 4.) It can also be created by stepped (or gradual) changes in the wall thickness of a crush box in the direction of collapse or by profiling the pressure source.

FIG. 7 illustrates that the two sheets 14A and 14B each have thermoformed hollow protruding crush-box-like shapes that inter-fit to form the multiple air-trapping cavities 15. The top sheet 14A has relatively deeper crush-box-like shapes, while the bottom sheet 14B has relatively shallower crushbox-like shapes. The bottom sheet 14B further has the channels 17 formed therein and also has air-release apertures for exiting of gases from the activator system 18. It is also noted that both thermoformed sheets 14A and 14B can be formed to fit around the curved outer surface of the "A" pillar (or other structural part) that they cover.

FIG. 8 illustrates that the crush boxes can be rectangular, orthogonal, or flat-sided shapes, and that they do not need to be cylindrically shaped nor conically shaped. However, in deployable crush boxes, the concept of the crush box with a side wall having a doubled-back region facilitates deployment by creating a telescopably extendable structure.

FIG. 9 illustrates a headliner 50 supported under the vehicle roof 12. The illustrated headliner 50 includes an energy absorber component (e.g. arrays of crush boxes) located in various critical areas, such as above the head of a vehicle driver at location 51, or above the head of a passenger at location 52. Also, a similar component can be located above or beside the head of a vehicle passenger (e.g. in a door panel or door sill area) near to the drive-side window at location 53, or in a rear area of the vehicle at location 54. FIG. 9 also illustrates that the present system can be used in an interior door panel of a vehicle at location 56 or along an edge of the headliner, the energy absorber being elongated from front to rear near the vehicle windows.

Modification

Figure 10:
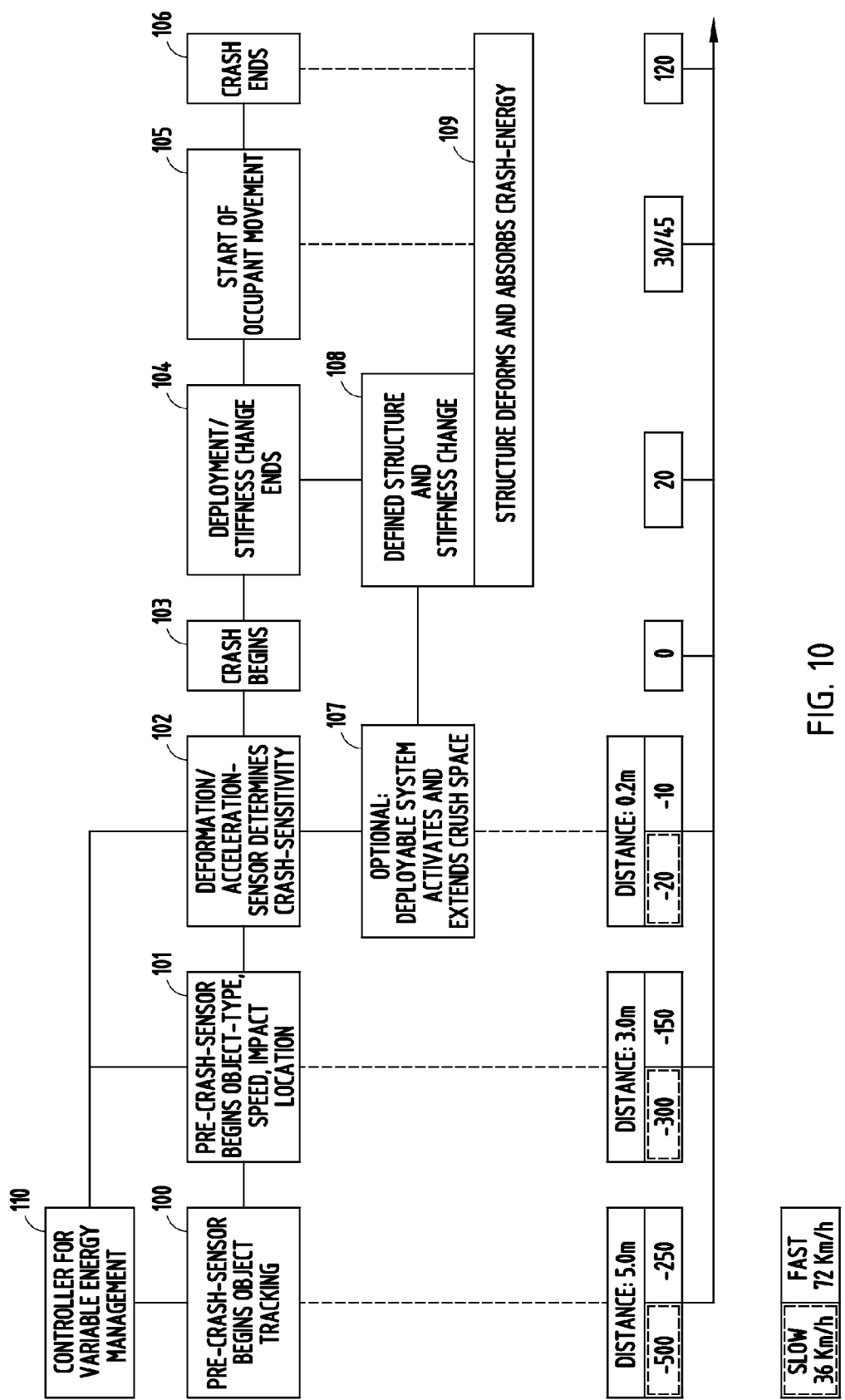
FIG. 10 is a flow diagram showing a sequence of a frontal crash, including application of a variable energy absorption management system.
Figure 12:
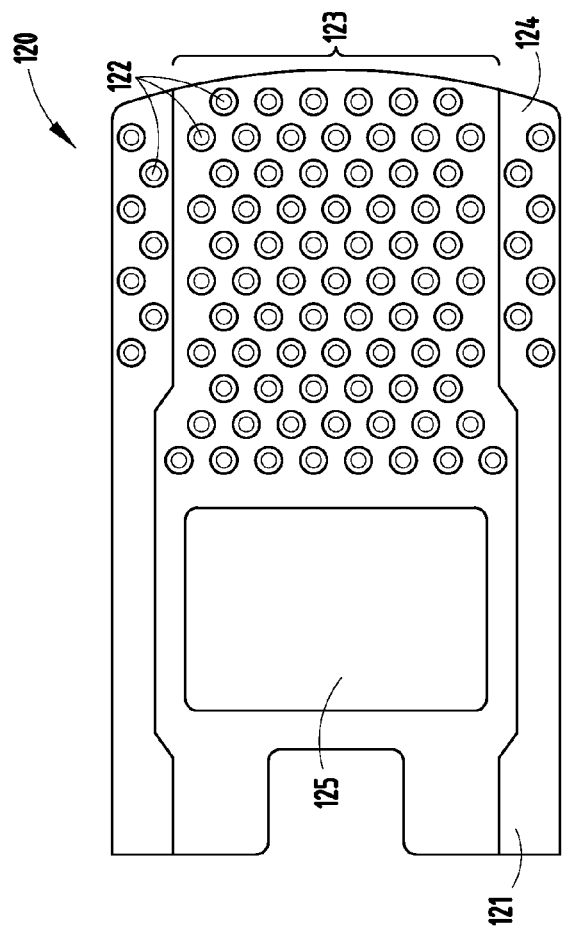
FIG. 12 is a plan view of a headliner including deployable energy-absorbing crush boxes.

FIG. 10 is a timeline illustrating a typical sequence of a vehicle frontal crash, based on the impact time being a reference point at zero seconds. The time line includes two different sets of data, the left one being for a relatively slow vehicle impact speed (36 Km/h) and the right one being for a relatively fast vehicle impact speed (72 Km/h). The sequence includes a step 100 where the pre-crash sensor(s) begins object tracking (distance is 5 meters, time is −500 milliseconds for slow speed and −250 ms for fast speed), a step 101 where the pre-crash sensor defines object type, speed, and impact location (distance is 3 m, time is −300 ms for slow and −150 ms for fast), a step 102 where the deformation/acceleration sensor determines crash severity (distance is 0.2 m, time is −20 ms for slow and −10 ms for fast), a point 103 of crash initiation (distance is 0, time is 0), a step 104 where deployment of crush boxes in the energy absorber or stiffening of the energy absorber component occurs (distance depends on what is being measured, time is 20 ms), a step 105 where movement of the occupant starts (time is 30 ms for slow and 45 ms for fast), and a step 106 where the crash ends (e.g., where the time is about 120 ms). During step 102, an optional step 107 occurs where the controller 110 of the variable energy management system determines whether to activate the deployable system to extend (i.e., vary) the crush stroke and/or stiffness of one or more of the particular energy-absorbing components. For example, the crush stroke may be changed by deploying (e.g., telescopingly extending) a crush box to provide a longer crush stroke, or by changing a stiffness of a crush box (e.g., adding compressed gases into the crush box or by controlling air out-flow by use of a valve or restricted orifice). If deployment or stiffness change is initiated in step 107, the structure and stiffness change occurs through the time period of step 108, preferably ending at about the time of step 104 or 105. The step 109 represents the actual structural deformation and absorption of crash energy, starting some time at or soon after the crash begins (step 103) and continuing until the crash ends (step 106).

Figure 11:
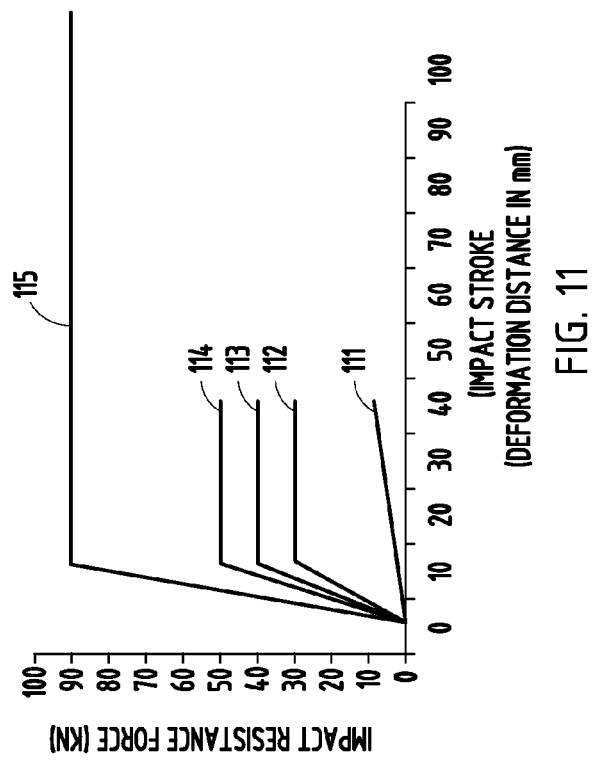
FIG. 11 is a graph showing different energy absorption profiles provided by the variable energy management system of FIG. 10.

FIG. 11 illustrates the energy-absorbing capability of a variable activation system, where different lines represent different energy absorbing profiles that can be achieved (i.e., different force of resistance versus different impact strokes). The line 111 represents a very low-speed impact, with none of the energy absorber components deployed (i.e., all components remain in their passive/un-deployed energy-absorbing states during the impact), such that all absorption of energy is through plastic deformation of the undeployed "static" components. Line 112 represents a low-speed impact, with maybe one energy absorber component deployed. For example, line 112 may be preferable in a pedestrian impact situation (see FIG. 19 or 20 for a front-of-bumper deployment). Line 113 represents an intermediate speed impact, with one or more energy-absorbing components deployed for an intermediate level of energy absorption. For example, line 113 may include deployment of a bumper component (FIG. 19 or 20) and activation of a valve to slow release of air cross-flowing between crush boxes (see FIG. 23). Line 114 represents a relatively high level crash requiring significant energy absorption. Line 114 may include deployment of air into various crush boxes both to deploy/extend the crush boxes as well as to increase their stiffness, provide air pressure for energy absorption and dissipation, and their ability to absorb energy. For example, this may include activation of passenger and driver air bags, headliner impact-absorbing components, and other selected components depending on the type of crash. (See FIG. 23 and components in FIGS. 9, 12-22.) The line 115 represents a catastrophic crash where passenger survival is at risk, and where all appropriate and relevant energy-absorbing components are activated to their most appropriate state of deployment. It is noted that another line similar to line 115 could be drawn where it is for a low speed impact and the desired energy absorption is low but there is a desire to reduce the impact stroke and keep damage away from expensive components.

It is specifically contemplated that the sensors referred to in steps 100-103 can include a variety of different sensors. For example, sensors are now commercially available and are commonly used to set off air bags for passenger safety in modern passenger vehicles. Sensors are further used in vehicles to sense a weight, size, and position of vehicle occupants. It is contemplated that sensors can be placed in and around vehicle bodies, both inside and outside. Also, sensors can include non-contact sensors such as object recognition sensors, proximity sensors, and infrared sensors, as well as accelerometers and other sensing means. The present discussion is sufficient for a person of ordinary skill to understand the present invention, and a more detailed discussion of sensors and sensor technology is not believed to be necessary.

The illustrated headliner 120 (FIG. 12) includes a panel 121 and an array of deployable/extendable crush boxes 122. The crush boxes 122 are configured and arranged to provide a first level of energy absorption in a central region 123, and are configured and arranged to provide a second level of energy absorption in side regions 124 along and above the rear side doors of the vehicle. The illustrated headliner 120 includes an open area 125, such as for a sun roof. Notably, the headliner 120 can be constructed so that the crush boxes 122 are visible and aesthetically formed. Alternatively, the headliner 120 can include a bottom treatment or skin to hide the crush boxes. FIG. 13 shows the crush boxes 122 un-deployed (i.e., in a "passive" state), and FIG. 14 shows the crush boxes 122 deployed/extended.

The "A" pillar cover 130 (FIG. 15) includes an outer skin 131 aesthetically treated to match the vehicle's passenger compartment, and an energy-absorbing component 132 with deployable crush boxes 133. The cover 130 is elongated and defines a channel for receiving an "A" pillar of a vehicle, with a top of the cover 130 extending to a headliner component and a bottom of the cover 130 extending to a door inner panel. The "A" pillar of a vehicle supports the vehicle's roof, and is positioned in front of a front door and beside the vehicle's windshield. The energy-absorbing component 135 (FIG. 16) is configured for use on a "B" pillar, which is the roof-supporting element behind a vehicle's front door and in front of the rear passenger door. The component 135 includes multiple deployable crush boxes 136 in a housing 137, the illustrated crush boxes 136 being in line with each other.

The door inner panel 140 (FIG. 17) includes a panel 141 for generally covering an inboard side of a door and for matching the décor of a vehicle's passenger compartment. The door inner panel 140 includes a first array of deployable crush boxes 142 along a top/rear of the door and includes a second array of deployable crush boxes 143 along a lower area. The crush boxes 142 are configured to provide energy absorption to cushion the impact of a passenger's head (such as during a side-impact-type vehicle crash), and the crush boxes 143 are configured to cushion the impact of a passenger's knee, ankle, leg, or hip.

Figure 18A:
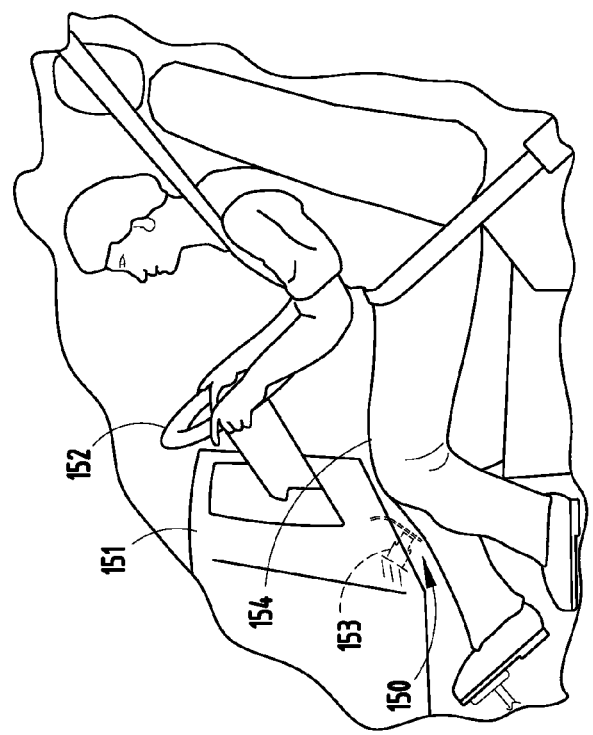
FIGS. 18-18A are side views of a vehicle with knee bolster and deployable energy-absorbing component extending the knee bolster for added knee protection for the vehicle driver, FIG. 18 showing the energy-absorbing component undeployed and FIG. 18A showing the energy-absorbing component deployed and moving the knee bolster closer to the occupant prior to movement of the occupant during an impact.

A knee bolster component 150 (FIG. 18) is positioned under a vehicle's instrument panel 151, under a steering wheel 152 on the driver side (or under the glove box on the passenger side). The knee bolster component 150 helps reduce a tendency of the occupant to submarine under the instrument panel of the vehicle during a severe front end crash. The component 150 includes a deployable crush box 153 that can be extended to move the knee bolster component closer to the passenger's knee 154 in the event of a vehicle crash. For example, a typical knee bolster component 150 would be about 4 to 5 inches from a driver's knee (or passenger's knee) in an undeployed state (FIG. 18), while the knee bolster component 150 would be about 2 to 3 inches from the knee when in a deployed state (FIG. 18A). FIG. 18B is similar to FIG. 18, but the energy absorbing component with crush box 153 is positioned on a face of the knee bolster component 150. By this arrangement, the knee bolster component 150 remains stationary while the crush box 153 extends toward the occupant's knee (FIG. 18C).

Figure 18:
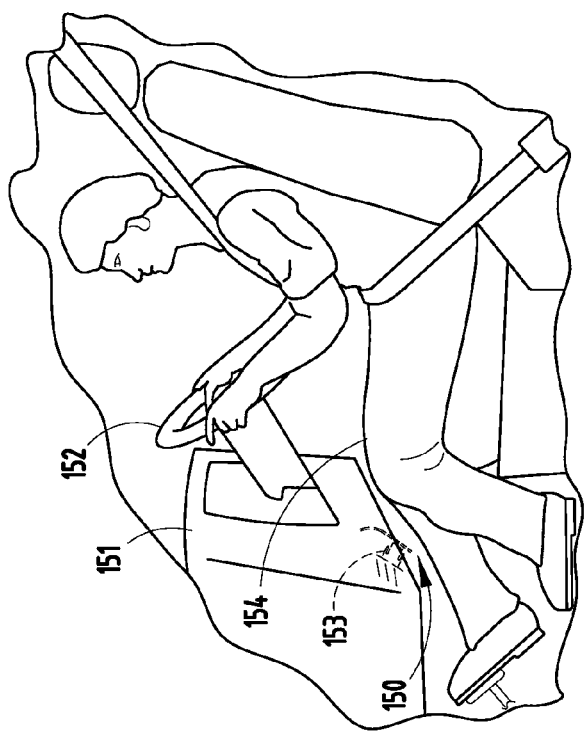
Figure 18C:
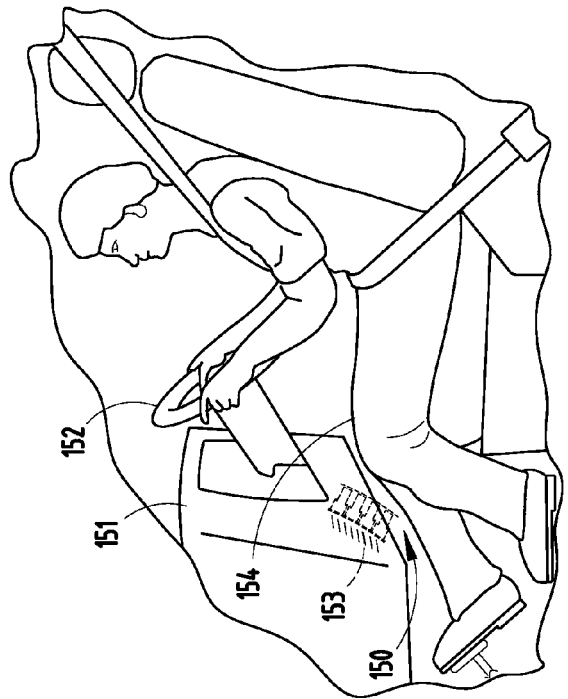
FIGS. 18B-18C are side views of a vehicle with stationary knee bolster and deployable energy-absorbing component on a surface of the knee bolster for added knee protection for the vehicle driver, FIG. 18 showing the energy-absorbing component undeployed and FIG. 18A showing the energy-absorbing component deployed prior to movement of the occupant during an impact.
Figure 18B:
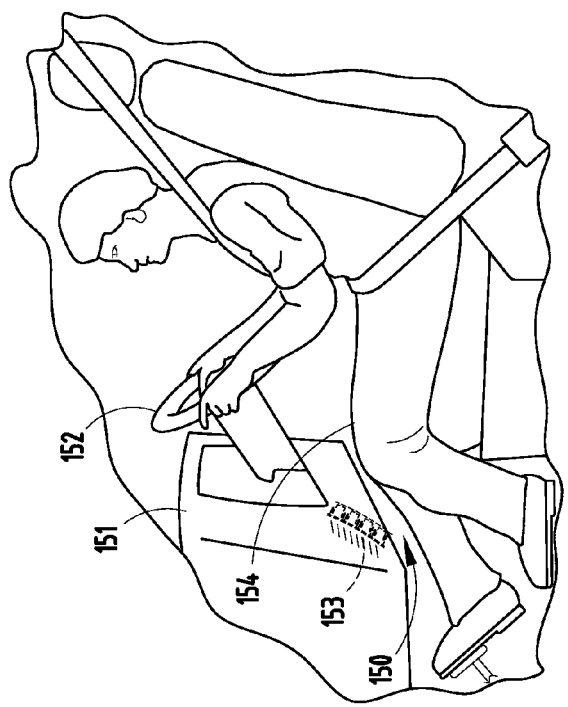
Figure 19:
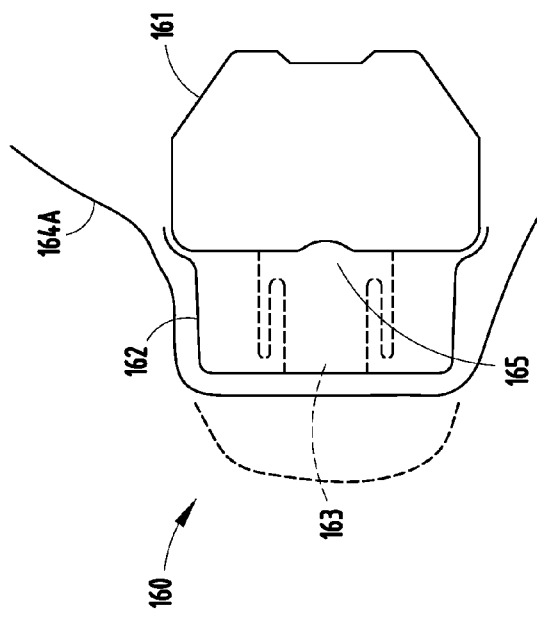
FIG. 19 is a side view of a vehicle bumper system including a deployable energy-absorbing component on a face of the bumper reinforcement beam.

FIGS. 18-18C show the beneficial effect of maximizing leg room for comfort and ease of ingress and egress to the vehicle. They also show that the component can be deployed to move the knee bolster or energy-absorbing component closer to the occupant (driver or passenger) during a crash. This closer position helps keep the occupant up on the seat to inhibit the occupant from "submarining" under the instrument panel. In addition to reducing leg injury, it is important to keep the occupant on the seat and in position to receive the benefit of the upper air bag deployment.

Figure 18D:
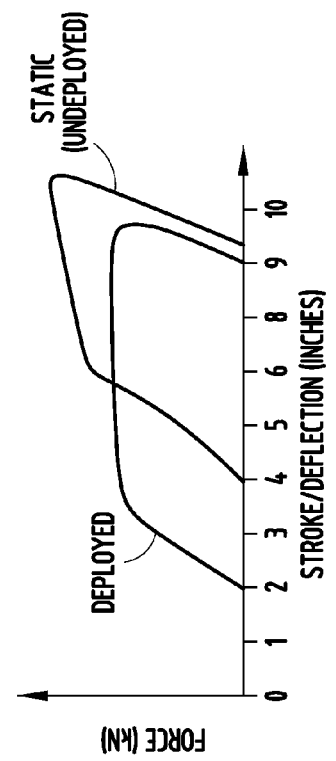
FIG. 18D is a graph showing force versus deflection of the energy-absorbing component and knee bolster in FIGS. 18 and 18B, the graph showing a first line representing the deployed energy-absorbing component with a longer crush stroke, and showing a second line representing a shorter crush stroke of the static (undeployed) energy-absorbing component.

FIG. 18D is a graph showing force versus deflection of the energy-absorbing component and knee bolster in FIG. 18 (or FIG. 18B), the graph showing a first line representing the deployed energy-absorbing component with a longer crush stroke and hence the ability to provide lower resistance force over a longer time period to absorb a desired amount of energy, and showing a second line representing a shorter crush stroke of the static (undeployed) energy-absorbing component and hence the need for a higher resistance force over a shorter time period in order to provide a desired impact resistance and energy absorption for the occupant's knee. The FIG. 18D shows how the loading stages operate with a deployed system when compared to the undeployed system. The deployed system results in the ability to reduce load on an occupant while absorbing a same amount of energy, and it does so with less total occupant movement. This reduces injury, both from the increased crush stroke and reduced resistance peak, and also by keeping the occupant on a vehicle seat in a position for benefiting form the air bag in the vehicle instrument panel.

It is contemplated that an energy absorber similar to the knee bolster component 150 or the other components discussed above could also be added in other places in the vehicle, such as to a glove box door, a vehicle head rest, a vehicle seating unit (e.g. on seat or back or armrests), a console (overhead or floor mounted), steering wheel, and the like. The formability of these features and their ability to integrate into structural components may be utilized to also let the components provide attachments, sound deadening, as well as structural support and function.

Figure 19A:
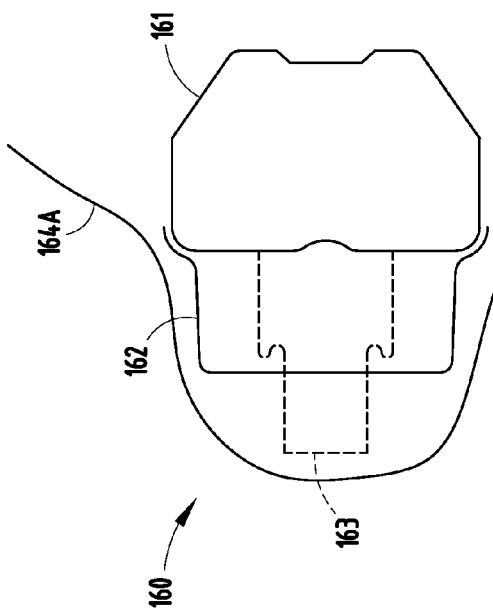
FIG. 19A is a similar view but with the energy-absorbing component deployed.

A bumper system 160 (FIGS. 19-20) includes a roll-formed tubular reinforcement beam 161, a polymeric energy absorber 162 with deployable crush boxes 163, and a fascia 164A aesthetically covering the bumper system 160. A back sheet 165 covers the crush boxes 163 so that air is entrapped therein, and potentially a valve (see FIG. 23) is placed at an air outlet orifice to control air flow to and from a cavity defined by the crush box. The crush boxes 163 can be deployed/extended (see dashed lines in FIG. 19 and also see FIG. 19A) to provide an additional impact stroke and also can be inflated with pressurized air (or the air outflow or cross flow of air restricted and/or controlled) to provide some additional impact stroke or change in stiffness for when a pedestrian is impacted.

Figure 20:
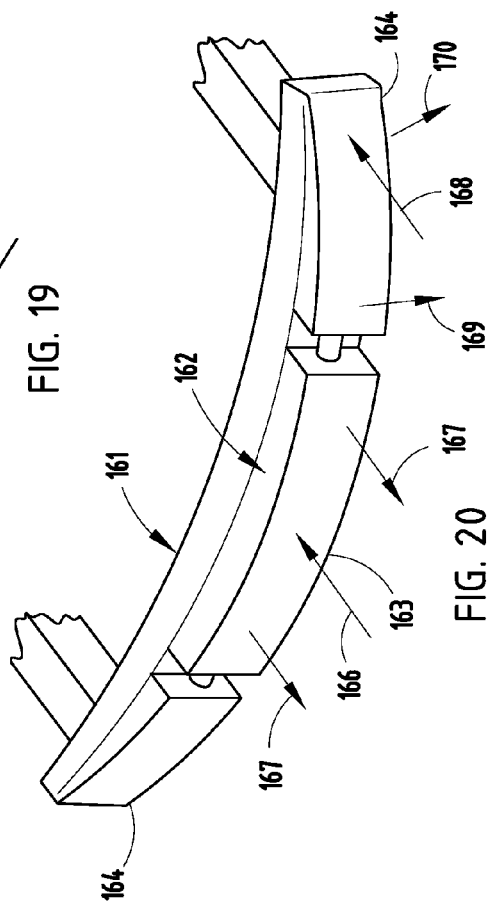
FIG. 20 is a perspective view of the energy-absorbing component of FIG. 19.

As shown by FIG. 20, the energy absorber 162 includes three elongated crush boxes, the center one being crush box 163 and the outboard ones being crush boxes 164. If the center crush box 163 is impacted in a center area at location 166, such as against a pedestrian's leg, the center area compresses. Air flows to the outer ends of the cavity of the crush box 163, causing the crush box 163 to bulge forward at locations 167. This acts to soften the impact against a pedestrian's leg, and further causes the crush box 163 to fold partially around and form to a shape of the leg, thus distributing forces against the leg in a manner reducing injury. In the outer crush boxes 164. If impact in their center area 168, then the inboard area 169 bulges outward, causing the pedestrian to be deflected in a sideways direction along arrow 170. Notably, by making the outboard crush boxes 164 to be wedge shaped with a thinner outer end, the crush box both supports the aerodynamic shape common in modern vehicles by helping to form a rounded corner, and further the bulging action described above tends to kick the impacted pedestrian in a side ways direction (rather than "catching" the pedestrian's leg like a baseball glove catching a ball).

As discussed above, for localized impacts such as against a pedestrian's leg, the response is soft. At the same time, for broader impacts, such as against a wall or another car, the resistance to crush is higher since the entire crush box is pressurized by forces against its entire front face. This results in a higher resistance to crush, potentially resulting in a shorter stroke (depending on a severity of impact) . . . potentially resulting in less damage to the vehicle. Specifically, the relationship of pressure and volume for gas is well known . . . $P_1V_1=P_2V_2=mRT$. As a sealed crush box is impacted, the volume reduces but the pressure goes up. Therefore, resistance to crush goes up. If the volume or air is able to transfer to adjacent crush boxes, the total volume for the air does not change and therefore the pressure does not increase. However, where air outflow from a crush box is restricted (e.g. by a valve or orifice) or air outflow is prevented (e.g. where the crush box is sealed and air cannot escape), the air pressure increases and increased impact resistance is provided.

FIG. 21 illustrates an injection-molded component 180 having a back panel 181 and a crush box 182 extending forwardly from the back panel 181. The crush box 182 defines a six-sided hexagon shape, and is customized to include a forwardly-formed pyramid-like outer side wall 183, a forwardly-deformed shelf 184, a rearwardly-formed pyramid-like inner side wall 185, and an internal panel 186. A plurality of stabilizing ribs 187 extend from the back panel 181 and support the outer side wall 183. Further the outer side wall 183 is undulated to create a stepped collapse. The inner panel 186 is not co-planar with the back panel 181, such that as the crush box 182 is crushed during a crush stroke, the rate of total energy absorption suddenly increases significantly when the inner column formed by walls 185/186 engages and begins to also be crushed.

FIG. 22 illustrates an instrument panel component 190 forming a structural part of the instrument panel of a vehicle, such as a rear half of a hybrid beam or a rear half of an air duct. The component 190 includes at least one deployable crush box 191 and mounting locations 192 for mounting items (e.g., bracket-like attachment locations) and panels 193 forming functional structure (e.g., panels forming part of a glove box or surface for supporting a glove box).

Figure 23:
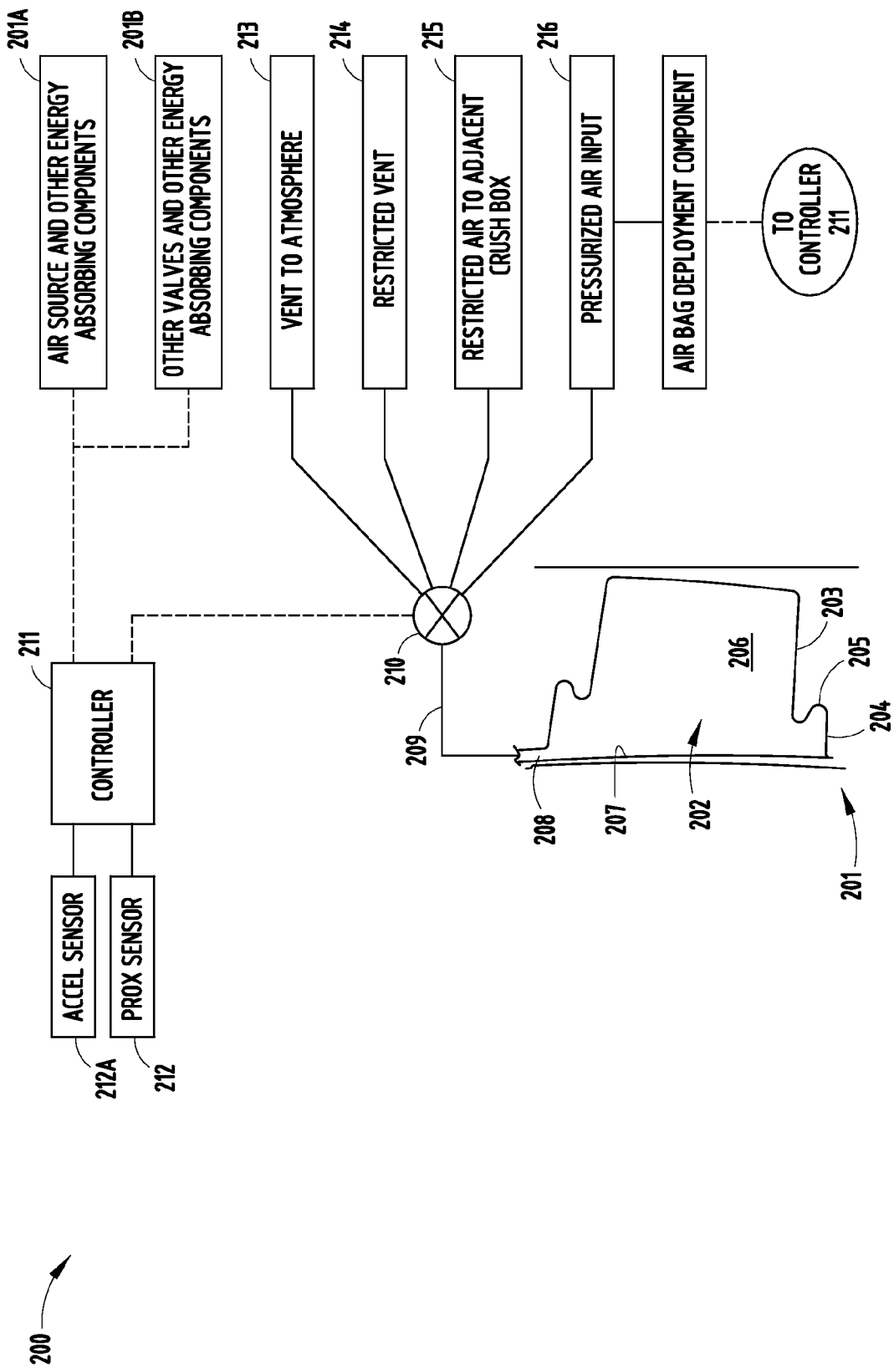
FIG. 23 is a schematic side view of a deployable crush box, including a variable energy management system connected to the deployable crush box, the system including a control valve for controlling outflow and inflow of air from and to the crush box.

FIG. 23 discloses a variable energy management system 200 connected to a plurality of components 201, 201A, and 201B. The component 201 is illustrated as having a deployable/extendable crush box 202. The crush box 202 includes side walls 203 and 204 connected by an off-set doubled-back portion 205. The crush box 202 defines a cavity 206, and a sheet 207 is bonded to the crush box 202 to close the cavity 206 except at inlet/outlet orifice 208. The off-set portion 205 allows the crush box 202 to be extended, such as when compressed fluid is forced into the cavity 206 through orifice 208. A fluid line 209 is connected to the orifice 208 and extends to a valve 210. The valve 210 is operably connected to a controller 211 (such as electrically) which receives input data from vehicle sensors 212 and 212A and which is programmed to selectively control movement of the valve 210 for selectively operating components 201, 201A, and 201B. The valve 210 is movable to various connected positions, including to a first vent 213 for venting out-flowing air to the atmosphere, to a second restricted vent 214 for restricted outflow of air, to a third vent 215 for redirecting air to adjacent crush boxes, or fourth vent 216 for directing compressed fluid (such as compressed air from an air bag inflation device) into the cavity 206 to deploy the crush box 202.

It is noted that the controller 211 can be connected to a number of different sensors and deployable energy-absorbing components for coordinated (simultaneous, sequential, or partial) deployment depending on the type and severity of vehicle crash that is sensed, depending on the size and physical position of occupants at the time of a crash, and depending on government regulations. By changing the algorithm and programming of the controller 211, the same energy absorbing system can be tuned to provide desired energy absorbing characteristics. This gives tremendous flexibility in a vehicle development, since adjustments to the energy-absorbing system can be made very quickly. Also, this allows identical energy-absorbing components to be used on different vehicle makes and models, even where different energy-absorbing characteristics are desired . . . simply by changing the programming of the controller.

Figure 24:
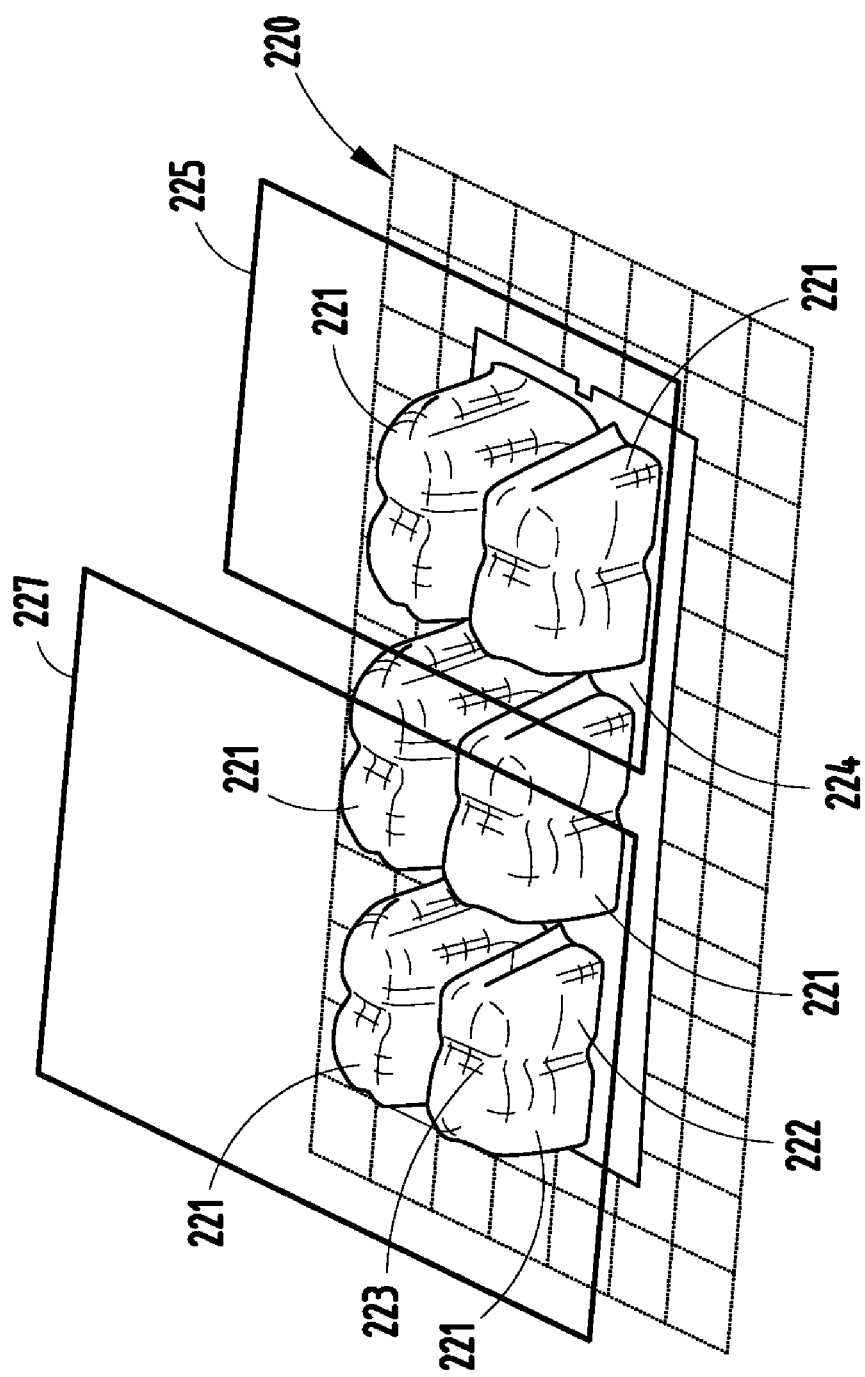
FIG. 24 is a perspective view of a two-by-three array of crush boxes.

FIG. 24 discloses a component 220 having six crush boxes 221. The crush boxes 221 includes undulating side walls 222 and top wall 223, and are arranged in a two-by-three orthogonal pattern. The illustrated crush boxes 221 are all identical in shape (but can be dissimilar), and are interconnected by air-conveying tunnels 224 with cross-over passages. (Notably, it is contemplated that more or less crush boxes, and crush boxes of different shapes and sizes could be included if desired.) If two crush boxes 221 are engaged during an impact, as illustrated by impacting object 225, the air flows into the other four crush boxes 221 and results in a first energy-absorbing profile. On the other hand, if four crush boxes 221 are engaged during an impact, as illustrated by impacting object 227, the air flows into the other two crush boxes 221 and results in a different energy-absorbing profile. The difference in energy-absorbing capability of two different profiles is not simply a ratio of the number of crush boxes impacted. In other words, if one impacts two crush boxes instead of one, the force of resistance may often be more than double. This can be due to a number of different factors, such as the ease of the air flowing from two crush boxes into four crush boxes (i.e., line 226) as compared to the difficulty and turbulence associated with air flowing from four crush boxes into two crush boxes (i.e. line 228). Also, adjacent crush boxes, when crushed, may affect stability of adjacent crush boxes.

Figure 25:
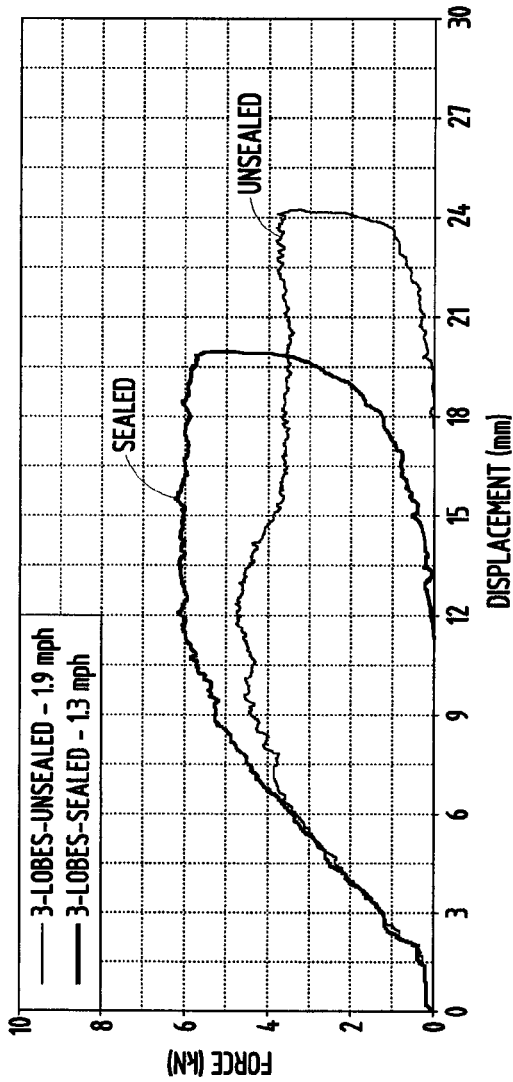
FIG. 25 is a graph showing an energy absorption profile (i.e., force versus deflection) when three adjacent crush boxes in a small area (compare to FIG. 24) are impacted, the higher shorter line showing three adjacent crush boxes sealed to entrap air and the lower longer line showing three adjacent crush boxes not sealed such that energy absorption is from crushed material of the crush boxes only.

FIG. 25 is a graph showing an energy absorption profile (i.e., force versus deflection) when three adjacent crush boxes in a small area (compare to FIG. 24) are impacted. The higher shorter line labeled as "sealed" shows the force and deflection of impacting three adjacent crush boxes, each being sealed to entrap air. The lower longer line labeled as "unsealed" shows the force and deflection of impacting three adjacent crush boxes, each not being sealed, such that air is not trapped and energy absorption comes from crushed material of the crush boxes only.

Figure 25A:
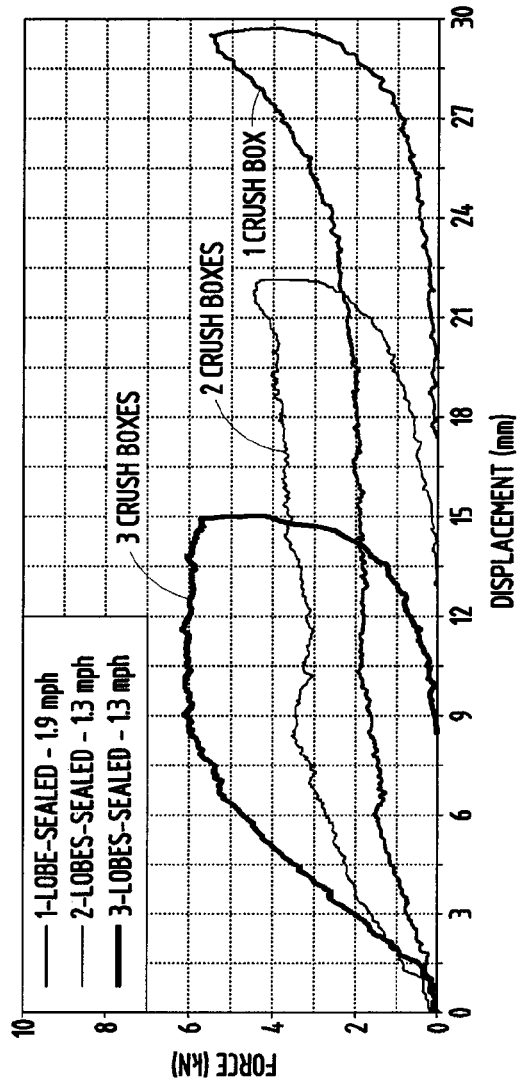
FIG. 25A is a graph showing an energy absorption profile i.e., force versus deflection) when adjacent sealed crush boxes in a small area are impacted, the three lines representing impact against a single sealed crush box, two adjacent sealed crush boxes, and three adjacent sealed crush boxes.

FIG. 25A is a graph showing an energy absorption profile (i.e., force versus deflection) when adjacent sealed crush boxes in a small area are impacted, the three lines representing impact against a single sealed crush box, two adjacent sealed crush boxes, and three adjacent sealed crush boxes.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An energy-absorbing system for a passenger compartment of a vehicle, the energy-absorbing system being adapted to cover an interior surface of a structural component and adapted to provide energy absorption for reducing passenger injury during a vehicle crash where the passenger is thrown against and impacts the interior surface, comprising:

an energy-absorbing component shaped to cover at least a portion of the interior surface of the structural component and defining a thickness extending generally perpendicular to the interior surface, the energy-absorbing component having crush box structures constructed to crush along a shorter first crush stroke distance and absorb energy based on a first energy absorbing profile when impacted in a direction generally parallel the thickness; and an activator connected to the crush box structures and constructed to telescopingly expand the crush box structures to an increased thickness to thus crush along a longer second crush stroke distance and absorb energy based on a second energy absorbing profile when a vehicle impact is sensed, the first and second energy absorbing profiles being different shapes and absorbing energy at different rates.

2. The system defined in claim 1, wherein the crush box structure includes a plurality of spaced-apart crush boxes.

3. The system defined in claim 1, including a programmable controller operably connected to the activator and to an air source for expanding the crush box structures.

4. The energy-absorbing system defined in claim 1, wherein the energy-absorbing component includes a knee bolster.

5. An energy-absorbing system for covering structural components in a passenger compartment of a vehicle, comprising:
first and second components including adjacent polymeric sheets, each defining a plurality of crush boxes that inter-fit to define air-trapping chambers, at least some of the crush boxes having an offset wall facilitating extension, the crush boxes each defining a thickness and being constructed to crush and absorb energy when impacted in a direction generally parallel the thickness.

6. The energy-absorbing system defined in claim 5, including an activator connected to at least some of the crush boxes to expand the at least some crush boxes to an increased thickness when a vehicle impact is sensed.

7. An energy-absorbing system comprising:
a sensor for sensing severity of vehicle impact;
an energy absorber made primarily of polymeric material and having internal structure that provides a first level of impact resistance over a first crush stroke distance; and
an activator and a controller operably connected to each other and to the sensor and to the internal structure for variably controlling energy absorption by the internal structure to provide a variable level of impact resistance including at least two additional different levels of impact resistance.

8. The energy-absorbing system defined in claim 7, wherein the controller includes a valve for controlling air flow in a passageway connected to the internal structure.

9. The energy-absorbing system defined in claim 8, wherein the valve controls air outflow from the internal structures.

10. The energy-absorbing system defined in claim 8, wherein the valve controls in-flow of air to the internal structure.

11. The energy-absorbing system defined in claim 8, wherein the internal structure includes spaced-apart crush boxes.

12. A system for absorbing energy in a vehicle comprising:
a vehicle including a body defining a passenger compartment with occupant-related energy-absorbing members and also including front and rear bumper systems with bumper-related energy-absorbing members, the occupant-related energy absorbing members and the bumper-related energy absorbing members each having respective energy-absorbing profiles with known rates of energy absorption during respective crush strokes;
sensors on the vehicle for sensing a type or severity of a vehicle impact and for generating a signal related to the type or severity of vehicle impact; and
a controller operably connected to the sensors and also to the occupant-related energy absorbing members and to the bumper-related energy-absorbing members; the controller being configured to receive the signal and to cause the occupant-related energy-absorbing members and to cause the bumper-related energy absorbing members to vary from the respective energy-absorbing profiles by changing at least one of the rate of energy absorption and a length of the crush stroke.

13. The system defined in claim 12, wherein the occupant-related energy-absorbing members include a knee bolster.

14. The system defined in claim 12, wherein the controller includes a valve controlling air outflow from one of the occupant-related energy absorbing members.

15. An energy-absorbing system for a passenger compartment of a vehicle, the energy-absorbing system being adapted to cover an interior surface of a structural component and adapted to provide energy absorption for reducing passenger injury during a vehicle crash where the passenger is thrown against and impacts the interior surface, comprising:
an energy-absorbing component shaped to cover at least a portion of the interior surface of the structural component and defining a thickness extending generally perpendicular to the interior surface, the energy-absorbing component having crush box structures constructed to crush along a crush stroke distance and absorb energy based on an energy-absorbing profile when impacted in a direction generally parallel the thickness; and
a valve connected to the crush box structures and constructed to control one of in-flow and out-flow of fluid to the crush box structures; and
a device for operating the valve based on a severity of vehicle crash to control flow of the fluid and therefore change the energy-absorbing profile of the crush box structures based on the type of vehicle crash.

16. The energy-absorbing system defined in claim 15, wherein the valve controls air outflow.

17. The energy-absorbing system defined in claim 15, wherein the valve controls in-flow of air to the crush box structures.

18. The energy-absorbing system defined in claim 15, wherein the crush box structures include a plurality of spaced-apart crush boxes connected by a sheet of polymeric material.

19. The energy-absorbing system defined in claim 15, wherein the energy-absorbing component includes a knee bolster.

20. A system for absorbing energy in a vehicle comprising:
a vehicle including a body defining a passenger compartment with at least one energy-absorbing member positioned within the passenger compartment, the energy-absorbing member being adjustable in energy-absorbing capability;
a sensor on the vehicle for sensing a vehicle impact and for generating a signal related to the vehicle impact; and
a control operably connected to the sensor and also to the energy-absorbing member; the control being configured to receive the signal and to cause the energy-absorbing member to adjust the energy-absorbing member in correspondence to a type of impact being experienced by the vehicle.

21. The system defined in claim 20, wherein the energy-absorbing member includes a knee bolster.

22. The system defined in claim 20, wherein the control includes a valve for controlling air flow in a passageway connected to the energy-absorbing member.

23. A variable energy management system for absorbing energy during a vehicle crash comprising:
a vehicle including a body defining a passenger compartment with at least one first deployable energy-absorbing member positioned within the passenger compartment and including a bumper system with at least one second deployable energy-absorbing member;
a sensor on the vehicle for sensing a vehicle impact and for generating at least one signal related to the vehicle impact; and a controller operably connected to the sensor and also to the first and second energy-absorbing members; the controller being configured to receive the signal and being programmed to selectively deploy one or both of the first and second energy-absorbing members in at least three different ways, the first way being to minimize injury to a pedestrian struck by the bumper system, the second way being to minimize injury to an occupant riding in the vehicle during a vehicle crash, and the third way being to minimize damage to the vehicle.

24. The system defined in claim 23, wherein the controller includes a valve for controlling fluid flow in a passageway connected to the first energy-absorbing member.

25. The system defined in claim 24, wherein the valve controls air outflow.

26. The system defined in claim 23, wherein the first energy-absorbing member includes a knee bolster.

27. A variable energy management system for absorbing energy during a vehicle crash comprising:
   a vehicle including a body defining a passenger compartment with at least one first deployable energy-absorbing member positioned within the passenger compartment and including a bumper system with at least one second deployable energy-absorbing member;
   a sensor on the vehicle for sensing a vehicle impact and for generating at least one signal related to the vehicle impact; and
   a controller operably connected to the sensor and also to the first and second energy-absorbing members; the controller being configured to receive the signal and being programmed to selectively deploy the first and second energy-absorbing members in ways associated with increasingly severe vehicle crashes.

28. The system defined in claim 27, wherein the controller includes a valve for controlling fluid flow in a passageway connected to the first energy-absorbing member.

29. The system defined in claim 28, wherein the valve controls air outflow.

30. The system defined in claim 27, wherein the first energy-absorbing member includes a knee bolster.

* * * * *